Dec. 21, 1954    R. E. BURRUS ET AL    2,697,491
HAND LIFT TRUCK
Filed Nov. 13, 1950    2 Sheets-Sheet 1

INVENTORS.
ROBERT E. BURRUS
MORRIS R. ELLIOTT
GEORGE L. TURNER
BY
ATTYS.

Dec. 21, 1954

R. E. BURRUS ET AL 2,697,491

HAND LIFT TRUCK

Filed Nov. 13, 1950

INVENTORS.
ROBERT E. BURRUS
MORRIS R. ELLIOTT
GEORGE L. TURNER
BY

ATTYS.

United States Patent Office 2,697,491
Patented Dec. 21, 1954

2,697,491

HAND LIFT TRUCK

Robert E. Burrus, Morris R. Elliott, and George L. Turner, Buchanan, Mich., assignors to Clark Equipment Company, Buchanan, Mich., a corporation of Michigan Application November 13, 1950, Serial No. 195,434

2 Claims. (Cl. 180—19)

Our invention relates generally to lift trucks, and, more specifically, is directed to self-propelled hand operated lift trucks for transporting pallet supported loads.

It is an object of the present invention to provide control means for a powered hand lift truck which will prevent a shift being made from forward to reverse drive, or vice-versa, whenever the prime mover of the truck is operating above an idling speed.

In accomplishing the aforesaid object, we provide a truck having a drive wheel driven from a prime mover through transmission means. First means is provided in the transmission whereby either forward or reversed drive may be selected. A control lever is mounted on the steering handle of the truck and means are provided between the lever and the first means whereby pivotal movement of the former effects actuation of the latter. In addition, a hand grip assembly is mounted in the steering handle and has connection with the throttle of the prime mover whereby rotation of the former effects opening and closing of the latter. The hand grip assembly includes means for preventing movement of the control lever when the throttle is in an open position. Consequently, shifts between forward and reverse drive, or vice-versa, can only be made when the prime mover is idling.

Now, in order to acquaint those skilled in the art with the manner of constructing and using the devices of our present invention, we shall described in connection with the accompanying drawings a preferred embodiment of our invention.

Figure 1:
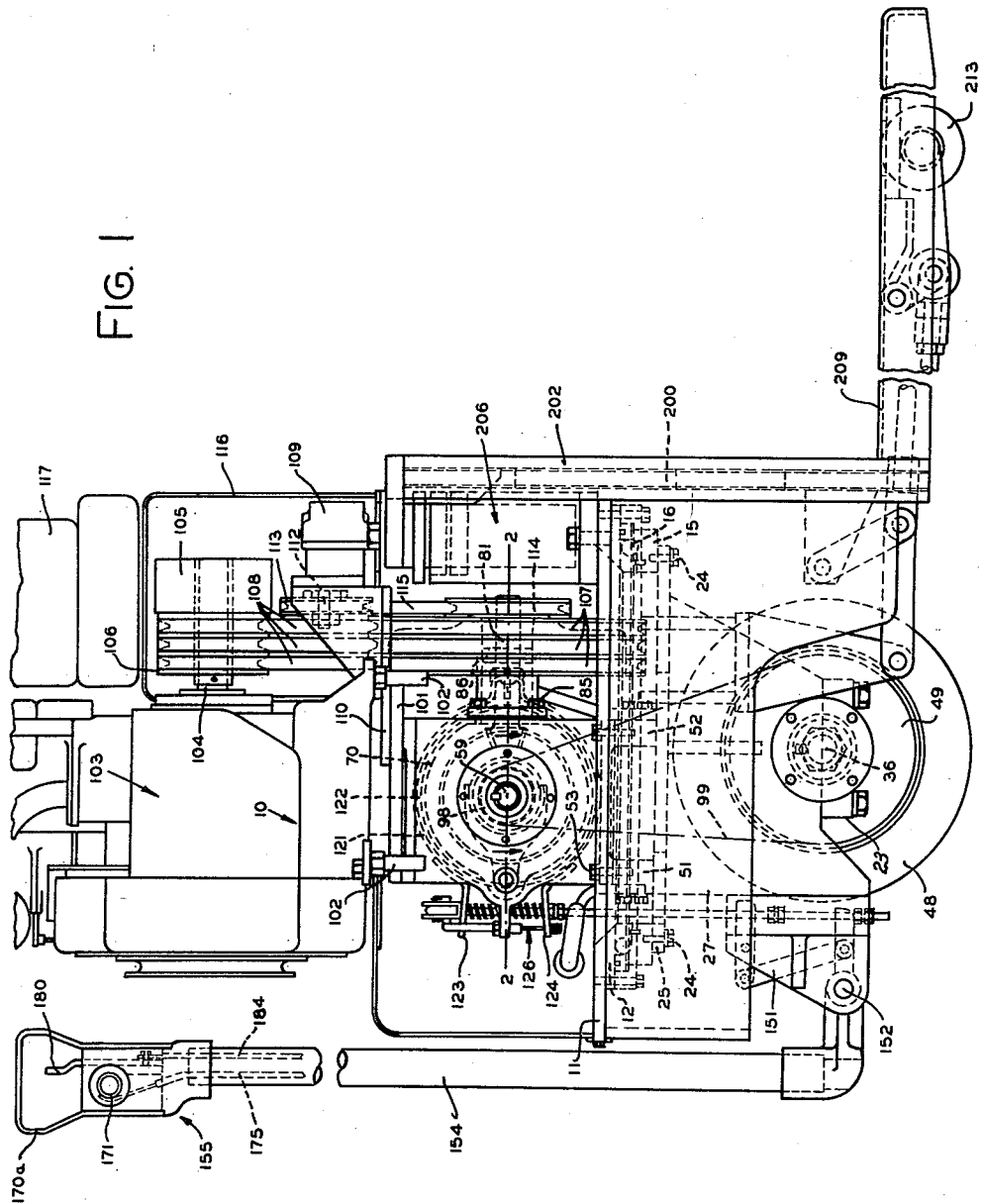
Figure 1 is a side elevational view of the hand lift truck of our present invention, with portions being broken away for the sake of clarity.

Referring now to the drawings, there is indicated generally by the reference numeral 10 the powered hand lift truck of our prevent invention, which comprises a horizontally etxending main frame member 11 having a large central opening formed therein. The main frame member 11 has secured to the lower end thereof, as by welding, an upper race member 12 which is associated with a lower race member 15. A plurality of ball members 16 are disposed between the upper and lower race members 12 and 15 for permitting relative rotation of the lower race member 15 with respect to the upper race member 12.

The lower race member 15 has secured to its lower surface, by means of a plurality of circumferentially spaced bolts 24, a horizontally extending rotatable frame member 25. Suitably secured to the lower surface of the rotatable frame member 25, as by welding, are the upper edges of a pair of horizontally spaced depending plate members 27. Bearing blocks 23 are secured to the plate members 27 and rotatably support the ends of a horizontal axle 36.

Mounted on the shaft 36, intermediate of the ends thereof, between the depending plate members 27, is a tire and wheel assembly 48. Secured to the shaft 36, adjacent one side of the tire and wheel assembly 48 is a multiple gear sprocket member 49. The purpose of the gear sprocket member 49 will be described fully hereinafter.

Figure 2:
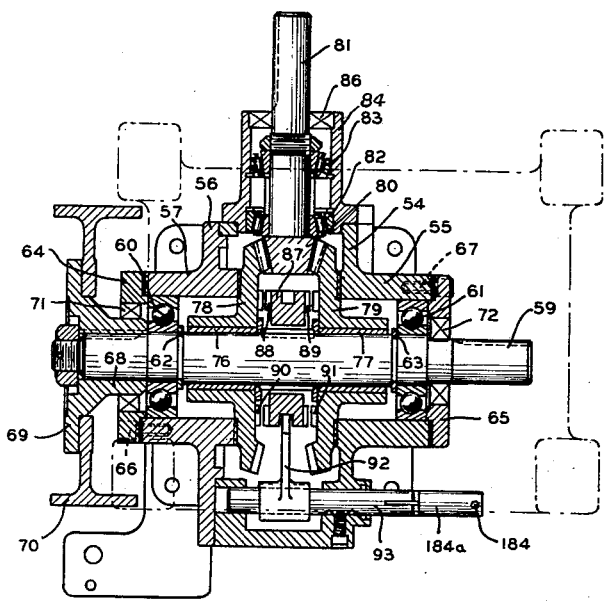
Figure 2 is a horizontal sectional view taken along the line 2—2 in Figure 1, looking in the direction indicated by the arrows, and shows the transmission of our present invention.

The rotatable frame member 25 has welded to its upper surface a pair of parallel horizontally spaced apart support bars 51 and 52. Secured to the upper edges of the support bars 51 and 52, by means of bolts 53, are the lower horizontal flange portions of a transmission housing 54, which transmission housing 54 extends upwardly through the central opening in the main frame 11. Formed integrally with the transmission housing 54, as shown in Figure 2, adjacent one side thereof, is a tubular extension 55. Secured to the opposite side of the transmission housing 54, is a side cover member 56 having a tubular extension 57 formed integrally therewith, which is coaxially aligned with the tubular extension 55.

As shown in Figure 2, a horizontal shaft 59 is rotatably journaled in ball bearing assemblies 60 and 61 mounted within the tubular extensions 57 and 55, adjacent the outer ends thereof. The ball bearing assemblies 60 and 61 are maintained in position by means of retaining rings 62 and 63, which are disposed about the shaft 59 in abutting engagement with a pair of shoulders formed therein, and by means of cap members 64 and 65 which are suitably secured to the outer ends of the tubular extensions 57 and 55 by means of bolts 66 and 67.

Keyed to one end of the shaft 59, outwardly of the transmission housing 54, is a flange member 68 having a radially extending portion 69, to which, at the outer circumeference thereof, is suitably secured a brake drum 70 for a purpose to be more fully described hereinafter.

An oil seal 71 is mounted between the outer periphery of the flange member 68 and the inner periphery of the cap member 64, and an oil seal 72 is mounted between the outer periphery of the shaft 59 and the inner periphery of a central opening formed in the cap member 65.

Mounted on the shaft 59, within the transmission housing 54, are a pair of axially spaced bearing sleeve members 76 and 77, upon which are rotatably journaled a pair of axially spaced apart bevel toothed side gears 78 and 79.

The side gears 78 and 79 have meshing engagement with the opposite sides of a bevel toothed pinion 80 carried by a shaft 81, which shaft 81 projects into the transmission housing 54 at right angles, with respect to the shaft 59. The shaft 81 is rotatably journaled, by means of a pair of tapered roller bearing assemblies 82 and 83, within a tubular extension 84. The tubular extension 84 is secured, by means of bolts 85, as shown in Figure 1, to one side of the transmission housing 54. An oil seal 86 is provided between the inner periphery of the tubular extension 84 and the outer periphery of shaft 81.

Mounted on the shaft 59, intermediate of the side gears 78 and 79, is an axially shiftable clutch collar member 87 having radial clutch teeth 88 and 89 which are adapted to be selectively disposed in engagement with radial clutch teeth 90 and 91 formed on the side gears 78 and 79, respectively.

The clutch collar member 87 is adapted to be shifted by means of a shift fork member 92 having a bifurcated end which is disposed in engagement with an annular groove formed in the clutch collar member 87. The fork member 92 is mounted on a shift rail 93 suitably journaled within the transmission housing 54, adjacent one side thereof. In the position shown in Figure 2, the clutch collar member 87 is in a neutral position. When the clutch collar member 87 is shifted to the left, from the position shown in Figure 2, the clutch teeth 88 are disposed in engagement with the clutch teeth 90 of the side gear 78, thereby clutching the latter to the shaft 59 for providing a driving connection between shaft 81 and shaft 59 in one direction. When the clutch collar member 87 is shifted to the right, from the position shown in Figure 2, the clutch teeth 89 are disposed in engagement with the clutch teeth 91 of gear 79, thereby clutching the latter to the shaft 59 for providing a driving connection between shaft 81 and shaft 59 in the opposite direction.

Mounted on the outer end of shaft 59, outwardly of the transmission housing 54, as shown in Figure 1, is a multiple sprocket pinion 98. The multiple sprocket pinion 98 is aligned vertically above the multiple sprocket gear member 49 mounted on the drive axle 36. A plurality of chains 99 are trained over the multiple sprocket pinion 98 and the multiple sprocket gear member 49 for effecting a driving connection between the shaft 59 of the transmission and the drive axle 36 upon which the tire and wheel assembly 48 is mounted. The chains 99 are shown diagrammatically for the sake of clarity.

The upper horizontal flange portions of the transmission housing 54 have secured thereto, as shown in Figure 1, a horizontal base member 101, which carries mounting studs 102, on which an internal combustion engine, indicated generally by the reference numeral 103, is mounted.

The internal combustion engine 103 has an output shaft 104 upon the outer end of which is mounted a conventional centrifugal clutch 105. Mounted coaxially of the output shaft 104 is a multiple groove pulley member 106 which is adapted to be clutched to the output shaft 104, by means of the clutch 105, when the speed of rotation of the output shaft 104 exceeds a predetermined value.

The transmission shaft 81, adjacent the outer end thereof, has secured thereon a multiple groove pulley member 107 which is aligned vertically below the multiple groove pulley member 106. A plurality of belt members 108 are trained over the pulley members 106 and 107 for effecting a driving connection therebetween.

A conventional hydraulic fluid pump 109 is suitably secured to the vertical leg of a bracket member 110, which, in turn, is secured along its horizontal leg to the upper surface of the horizontal base member 101. The hydraulic fluid pump 109 has an input shaft 112, to which is suitably secured a pulley member 113. The pulley member 113 is aligned vertically above the pulley 114, formed integrally with the multiple pulley member 107. A belt 115 is trained over the pulley members 113 and 114 for effecting a driving connection therebetween.

The clutch 105 and the hydraulic fluid pump 109 are enclosed by a suitable cover member 116. Mounted vertically above the cover member 116 is a fuel tank 117.

Disposed about the aforedescribed brake drum 70 is a brake band 121 having a frictional surfacing material 122 which is adapted to be disposed in frictional engagement with the brake drum 70. Secured to the ends of the brake band 121 are a pair of vertically spaced apart brake frame members 123 and 124. The brake frame member 123 is adapted to be moved toward the brake frame member 124 for applying the brake band 121 to the brake drum 70 by means of linkage means, indicated generally at 126, which is actuated by the steering handle 154 whenever the handle is disposed in either a substantially vertical or substantially horizontal position. The lower end of the tubular steering handle 154 is journaled on a horizontal shaft 152 which is secured in plate members 151 carried by the depending plate members 27. Arranged at the upper end of the handle 154 is a control head 155, which shall be described more fully hereinafter.

The rotatable frame 25, transmission housing 54, prime mover 103, clutch 105, fluid pump 109, tire and wheel assembly 48, and steering handle 154 are adapted to rotate as a unit.

Figure 3:
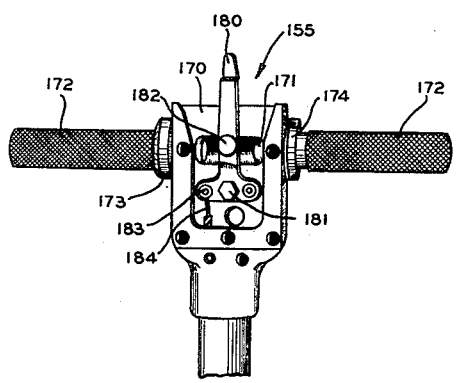
Figure 3 is a front elevational view of the steering control head of our present invention.
Figure 4:
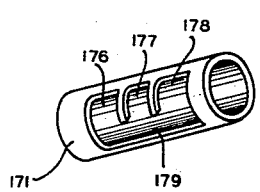
Figure 4 is a perspective view of the control sleeve member which is adapted to be disposed within the steering control head of Figure 3.

We shall now describe, in connection with Figures 1, 3, and 4, the details of construction and operation of the control head 155. The control head 155 comprises a housing 170 in which is rotatably mounted a tubular sleeve member 171. Secured to the ends of the sleeve member 171, coaxially thereof, are a pair of hand grips 172 which are adapted to extend laterally outwardly of the housing member 170. The hand grips 172 and sleeve member 171 are held against axial movement by means of a fixed collar member 173 and a detachably mounted collar member 174. Removal of the detachable collar member 174 permits the sleeve member 171 and the hand grips 172 to be removed axially from the housing member 170. The rotatable hand grips 172 have suitable connection with the throttle of the prime mover 103 of the industrial truck through a cable 175, which extends through the tubular steering handle 154, as shown in Figure 1. Rotary movement of the hand grips 172 and sleeve member 171 in a clockwise direction, as viewed in Figure 1, causes the prime mover 103 to be accelerated while counterclockwise rotation of the hand grips 172 and sleeve member 171 causes the prime mover 103 to be decelerated. Mounted across the top of the steering head 155 and secured to the housing 170 is an inverted U-shaped hand guard 170a.

The sleeve member 171 has formed therein three peripheral slots 176, 177, and 178 which are interconnected adjacent their one ends by an axially extending slot 179.

Pivotally mounted, by a bolt 181, to the housing member 170 of the steering control head 155 is a hand lever 180. The lever 180 is provided with a locating pin 182 which is adapted to extend through the housing 170 and into the aforedescribed slots 176, 177, 178 and 179 formed in the sleeve member 171. The control lever 180 is provided with a laterally extending arm 183 to which, at the outer end thereof, is pivotally mounted one end of a cable 184 which is adapted to be disposed within the tubular steering handle 154 and, at its other end is connected with one leg of a bell crank 184a pivotally mounted to the transmission housing 54. The other leg of bell crank 184a has connection with the aforedescribed shift rail 93 mounted in the transmission housing 54.

When the hand grips 172 and sleeve member 171 are rotated counterclockwise, as viewed in Figure 1, until the locating pin 182 is disposed in engagement with the lower edge of the axial slot 179, the lever 180 may be pivoted about the mounting 181 which, through the cable 184, effects axial movement of the shift rail 93. It will thus be seen that the clutch collar member 87 may be disposed in engagement with either of the transmission side gears 78 or 79 for providing forward or reverse drive to the tire 48 for powering the truck. Likewise, the clutch collar member 87 may be disposed in a neutral position, as shown in Figure 2. When the locating pin 182 is disposed in slot 179, the prime mover 103 is at an idle condition and the centrifugal clutch 105 is inoperative for effecting a driving connection between the prime mover 103 and the transmission input shaft 81, thereby permitting the clutch collar member 87 to be shifted into and out of engagement with side gears 78 and 79 without gear clash.

When it is desired to drive the hydraulic fluid pump 109, provided for operating the various fluid operated devices on the truck, as will be more fully described hereinafter, the lever 180 is disposed in a central position, as shown in Figure 3. The hand grips 172 and sleeve member 171 may then be rotated clockwise, as viewed in Figure 1, with the locating pin 182 being disposed within the peripheral slot 177. In this position, the transmission clutch collar member 87 is in a neutral position and thus drive is not effected to the truck. However, clockwise rotation of the hand grips 172 causes an increase in speed of the prime mover 103 which renders the clutch 105 operable, thereby effecting a driving connection to the hydraulic fluid pump 109. It should be noted that when the prime mover 103 is in other than an idle condition, the lever 180 cannot be pivoted from its neutral position. If it is desired to drive the truck in one direction, the hand grips 172 and sleeve member 171 are rotated counterclockwise, as viewed in Figure 1, until the locating pin 182 is disposed within the axial slot 179. Then the lever 180 may be pivoted about the mounting 181 until the locating pin 182 is disposed in one of the peripheral slots 176 or 178, depending on the direction in which drive is to be desired. When the pin is disposed in one of these slots 176 or 178, the hand grips 172 and sleeve member 171 may be rotated clockwise, as viewed in Figure 1, thereby causing the pin to be guided in either of the latter two slots. As aforedescribed, clockwise rotation of the hand grips 172 and sleeve member 171 causes the prime mover 103 to accelerate, which causes the clutch 105 to be rendered operable, thereby effecting a driving connection between the prime mover 103 and the transmission input shaft 81 through the pulley belts 108.

The forward end of the hand lift truck 10, as shown in Figure 1, is provided with load supporting means comprising a vertical transverse plate member 202 which is slidably mounted along a plate member 200 secured to the horizontal main frame 11. Secured to the lower end of the plate member 202 are forwardly extending load supporting frames or forks 209 which are supported on ground engaging roller members 213.

The plate member 202, together with the forks 209, is adapted to be elevated by means of hydraulic piston and cylinder assemblies, one of which is indicated generally at 206. Suitable linkage means is arranged between the plate member 202 and the rollers 213 for effecting pivotal movement of the latter toward the plate 202 as the forks 209 are being elevated. With this arrangement the forks 209 are always supported on the rollers 213 irrespective of the elevated position of the forks.

We shall now describe the operation of the powered hand lift truck of our present invention in engaging, transporting, and depositing a pallet supported load. After the operator has manipulated the steering handle 154 so as to dispose the forwardly projecting fork frames 209 beneath a pallet supported load, the lever 180 is disposed in a central position. The hand grips 172 are then rotated clockwise, from the position shown in Figure 1, thereby causing the internal combustion engine 103 to accelerate which effects actuation of the centrifugal clutch 105. Actuation of the clutch 105 effects a driving connection between the internal combustion engine 103 and the hydraulic fluid pump 109, which builds up fluid pressure and delivers it through suitable fluid lines (not shown) to the aforementioned hydraulic piston and cylinder assemblies 206 for effecting raising of the vertical transverse plate member 202, together with the fork frames 209.

After the pallet supported load has been raised from the ground by the fork frames 209, the hand grips 172 are rotated counterclockwise toward the position shown in Figure 1, thereby disposing the guide pin 182 into the axial slot 179 formed in the sleeve member 171. This returns the internal combustion engine 103 to an idle condition and renders the clutch 105 inoperable. The lever 180, together with guide pin 182, is then shifted toward one of the peripheral slots 176 or 178, depending upon whether the truck is to be driven forwardly or rearwardly, which disposes the clutch collar member 87 into engagement with one of the transmission side gears 78 or 79 for effecting either forward or reverse drive thereto. The hand grip 172 is then again rotated clockwise from the position shown in Figure 1, which effects an increase in speed in the internal combustion engine 103 causing the clutch 105 to be rendered operable again for effecting a drive connection between the internal combustion engine 103 and the transmission input shaft 81. Drive is then effected from the input shaft 81, through the appropriate side gears 78 or 79, to the transmission output shaft 59, and hence through chains 99 to the drive tire and wheel assembly 48 for effecting a driving connection to the ground.

Steering of the truck is effected by rotating the rotatable frame 25, with respect to the main frame 11, by means of the steering handle 154.

After the truck and pallet supported load have been driven to the location where the pallet supported load is to be deposited, the handle 154 may be disposed in either a vertical or horizontal position for braking the output shaft of the transmission, which, in turn, brakes the vehicle. The hand grips 172 are then rotated counterclockwise to the position shown in Figure 1, until the locating pin 182 is again disposed in the axially extending slot 179 for returning the internal combustion engine 103 to an idling condition. Fluid under pressure is then bled from the hydraulic piston and cylinder assemblies 206 which permits the vertical transverse plate member 202, together with the fork frames 209, to be lowered. After the pallet supported load has been deposited in contact with the ground, the industrial truck may be withdrawn rearwardly.

While we have shown and described what we believe to be a preferred embodiment of our invention, it will be understood that various modifications and rearrangements may be made therein without departing from the spirit and scope of our present invention.

We claim:

1. For use in an industrial truck including a drive wheel, a prime mover having a throttle, a transmission having an input and an output shaft, the input shaft being driven by the prime mover and the output shaft having driving connection with the drive wheel, and first means between the input and output shafts for selectively effecting either forward or reverse drive therebetween, the combination of a steering handle mounted on the truck, a lever pivotally mounted to said steering handle at the outer end thereof, means between and having connection with said lever and the first means whereby pivotal movement of said lever effects actuation of the first means, a hand grip assembly rotatably mounted in said steering handle at the outer end thereof, means between and having connection with said hand grip assembly and the throttle whereby rotation of said hand grip assembly effects opening and closing of the throttle, and said hand grip assembly including means for preventing movement of said lever when the throttle is in an open position.

2. For use in an industrial truck including a drive wheel, a prime mover having a throttle, a transmission having an input and an output shaft, the input shaft being driven by the prime mover and the output shaft having driving connection with the drive wheel, and first means between the input and output shafts for selectively effecting either forward or reverse drive therebetween, the combination of a steering handle mounted on the truck, a hand grip assembly rotatably mounted in said steering handle at the outer end thereof, means between and having connection with said hand grip assembly and the throttle whereby rotation of said hand grip effects opening and closing of the throttle, said hand grip assembly including a central tubular cylinder, three peripheral slots formed in said tubular cylinder, an axial slot interconnecting the one ends of said peripheral slots, a lever pivotally mounted to said steering handle at the outer end thereof, a locating pin secured to said lever and projecting into one of the slots in said tubular cylinder, means between and having connection with said lever and the first means whereby when said lever is pivoted so as to dispose said locating pin in one of said peripheral slots the first means is actuated for effecting forward drive between the input and output shafts and when said lever is pivoted so as to dispose said locating pin in the second of said peripheral slots the first means is actuated for effecting reverse drive between the input and output shafts and when said lever is pivoted so as to dispose said locating pin in the third of said peripheral slots the first means is disposed in a neutral position, and said locating pin being permitted to be passed between said peripheral slots through said axial slot only when said hand grip assembly is rotated to a position closing the throttle.

References Cited in the file of this patent

UNITED STATES PATENTS

| Number | Name | Date |
|---|---|---|
| 2,399,605 | Schroeder | Apr. 30, 1946 |
| 2,422,538 | Framhein | June 17, 1947 |
| 2,433,235 | Panish | Dec. 23, 1947 |
| 2,443,480 | Schwitzer et al. | June 15, 1948 |
| 2,461,188 | Stoner | Feb. 8, 1949 |
| 2,513,718 | Gfrorer | July 4, 1950 |
| 2,550,548 | Framhein | Apr. 24, 1951 |